May 24, 1949.                    H. LUBY                    2,471,337
                          AUTOMOTIVE PARTS TRUCK
Filed Sept. 7, 1948                                     2 Sheets-Sheet 1
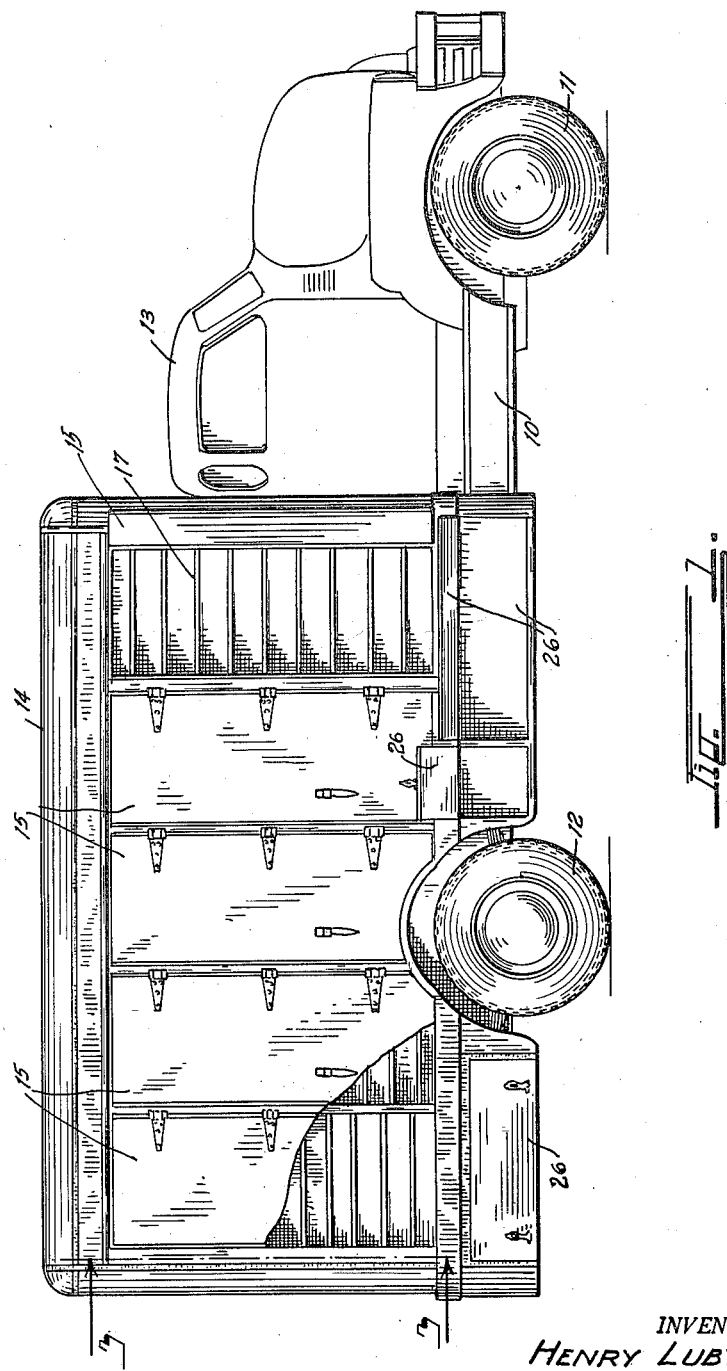
INVENTOR.
HENRY LUBY
BY
                    ATTORNEY.

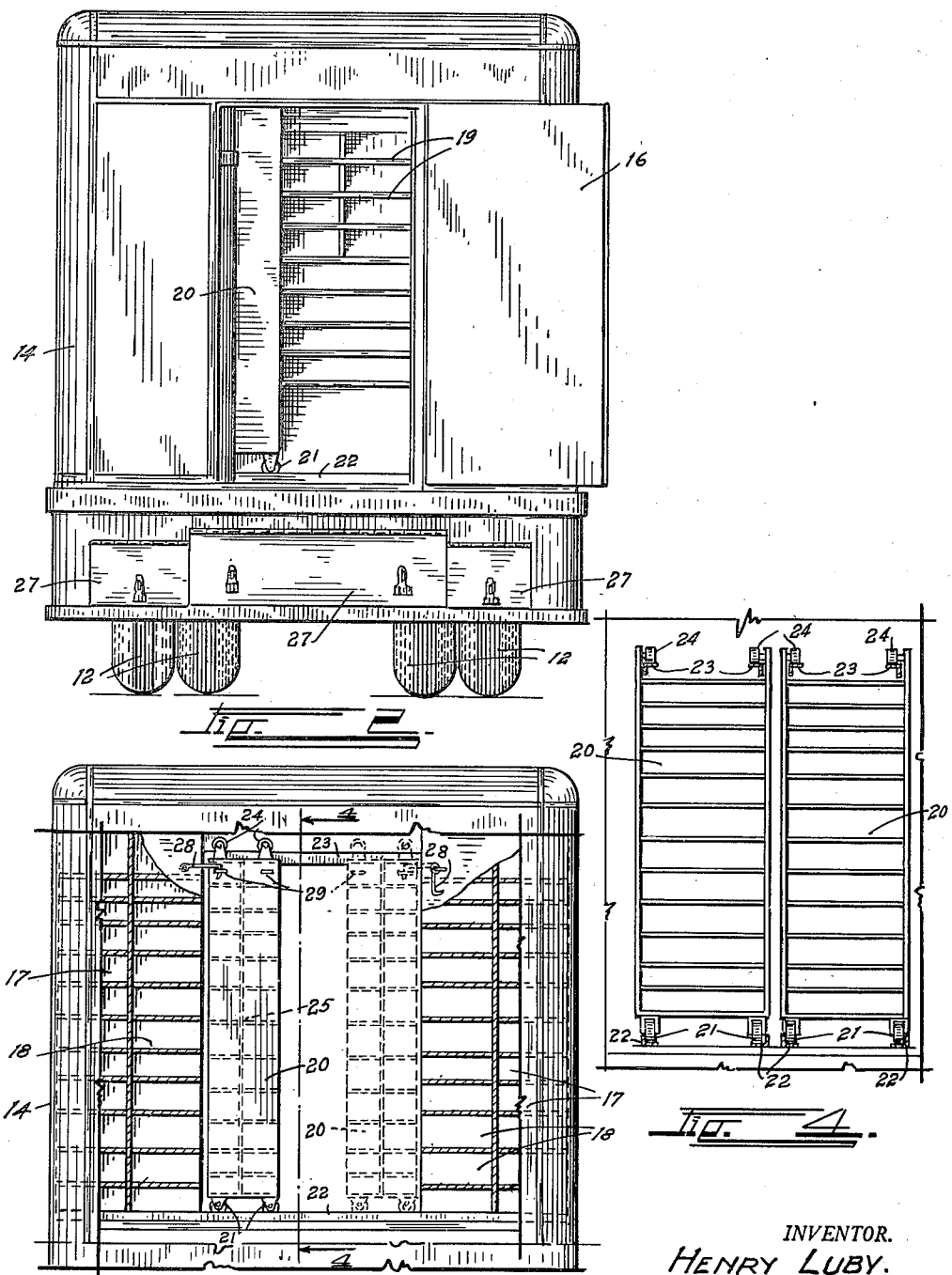

Patented May 24, 1949

2,471,337

UNITED STATES PATENT OFFICE 2,471,337

AUTOMOTIVE PARTS TRUCK

Henry Luby, Denver, Colo.

Application September 7, 1948, Serial No. 48,037

3 Claims. (Cl. 296—24)

This invention relates to what might be termed an "automotive parts truck," and has for its principal object the provision of an automotive vehicle in which an exceedingly large variety of automotive parts may be carried, and which will make these parts quickly and individually available for sale and distribution.

Another object of the invention is to provide a truck body with a plurality of shelves so arranged in cases to obtain maximum accessibility to a maximum number of shelves on a portable vehicle.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a side view of the improved automotive parts truck partially broken away to show the interior construction;

Fig. 2 is a rear view of the improved automotive truck, illustrating a rear door thereof in the open position;

Fig. 3 is a cross-section, taken on the line 3—3, Fig. 1; and

Fig. 4 is a detail section, taken on the line 4—4, Fig. 3.

The improved automotive parts truck employs a truck chassis 10 supported on the usual sets of front and rear wheels 11 and 12, respectively, and provided with the conventional driver's cab 13. A relatively large, rectangular, enclosed body 14 is mounted on the chassis 10 rearwardly of the cab 13.

A plurality of side doors 15 are hinged in the body 14 in closely spaced relation along both sides thereof, and a relatively large rear door 16 hingedly opens from the middle of the back of the body 14.

An outside shelf case 17 is mounted inside of each of the side doors 15. An inside shelf case 18 is mounted immediately inside of each of the outside shelf cases 17 so as to face inwardly into the body 14, outlining an aisle-way throughout the length of the truck, and accessible through the rear door 16.

A front end case 19 extends across the aisle-way immediately back of the cab 13. Thus, it can be seen that any shelf in the outer cases 17 may be quickly and easily reached by opening the proper door 15, and that any shelf in the inner cases 17 and 19 can be quickly and easily reached by entering the aisle-way through the rear door 16.

The capacity of the shelf cases 17 and 18 is increased approximately fifty per cent by means of a plurality of movable shelf cases 20, there being one movable shelf case 20 positioned between each pair of opposite inner cases 17. The movable shelf cases 20 are supported upon bottom rollers 21 travelling in bottom tracks 22 extending transversally of the aisle-way of the body 14. They are maintained in upright position by means of upper tracks 23 extending laterally over the aisle-way, there being upper rollers 24 on the cases 20 arranged to travel along the upper tracks 23.

The majority of automotive parts are rather small, such as screws, nuts, bolts, clips, terminals, etc., so that they require only short, shallow shelves and drawers. Therefore, it is not feasible to have drawers or shelves extending entirely across the cases 20. They are therefore divided by a vertical partition 25 and face outwardly toward both sides of the cases 20. To allow access to both sides of the cases, it is only necessary to roll them or move them from one side of the aisle-way to the other.

For larger and heavier parts, cabinets are provided below the doors 15 at each side of the case and closed by means of lower doors 26. Similar cabinets are formed below the rear door 16 and closed by means of rearwardly opening doors 27.

It can be seen that as the result of long study and the application of inventive principles, every possible available place on the vehicle has been utilized for storage purposes, and that easy access has been provided to all of the storage spaces. Any desired stored part can be immediately reached, and yet all are securely stored in their proper places.

Hooks 28 are provided on the inner cases 18 to engage eyes 29 on the ends of the cases 20 to lock them in place against the cases 17 to prevent shifting of the load during transportation.

While a specific form of the improvement has been described and illustrated herein, it is to be understood that the same may be varied, within the scope of the appended claims, without departing from the spirit of the invention.

Having thus described the invention what is claimed and desired secured by Letters Patent is:

1. A vehicle for the storage and transportation of small parts, comprising: an automotive truck chassis; a relatively large, rectangular, enclosed body mounted on the chassis; a plurality of side doors hinged in the body in closely spaced relation along both sides thereof; a relatively large rear door hingedly mounted in the middle of the back of the body; a plurality of outside shelf cases, there being one outside shelf case mounted inside of each of the side doors; an inside shelf case mounted immediately inside of each outside shelf case so as to face inwardly into the body to form sides on a longitudinally extending central aisle-way in the body, said rear door providing access to said central aisle-way; guide means extending transversally of said body between said inside shelf cases and across said aisle-way; and movable shelf cases mounted on said guide means so that they may be moved to either side of said aisle-way.

2. A vehicle for the storage and transportation of small parts, comprising: an automotive truck chassis; a relatively large, rectangular, enclosed body mounted on the chassis; a plurality of side doors hinged in the body in closely spaced relation along both sides thereof; a relatively large rear door hingedly mounted in the middle of the back of the body; a plurality of outside shelf cases, there being one outside shelf case mounted inside of each of the side doors; an inside shelf case mounted immediately inside of each outside shelf case so as to face inwardly into the body to form sides on a longitudinally extending central aisle-way in the body, said rear door providing access to said central aisle-way; guide means extending transversally of said body between said inside shelf cases and across said aisle-way; movable shelf cases mounted on said guide means so that they may be moved to either side of said aisle-way; and vertical, longitudinally extending partitions in said movable shelf cases dividing the latter so that the shelves therein are accessible from both faces of the movable shelf cases.

3. A vehicle for the storage and transportation of small parts, comprising: an automotive truck chassis; a relatively large, rectangular, enclosed body mounted on the chassis; a plurality of side doors hinged in the body in closely spaced relation along both sides thereof; a relatively large rear door hingedly mounted in the middle of the back of the body; a plurality of outside shelf cases, there being one outside shelf case mounted inside of each of the side doors; an inside shelf case mounted immediately inside of each outside shelf case so as to face inwardly into the body to form sides on a longitudinally extending central aisle-way in the body, said rear door providing access to said central aisle-way; guide means extending transversally of said body between said inside shelf cases and across said aisle-way; movable shelf cases mounted on said guide means so that they may be moved to either side of said aisle-way; vertical, longitudinally extending partitions in said movable shelf cases dividing the latter so that the shelves therein are accessible from both faces of the movable shelf cases; and means for locking said movable shelf cases against said inside shelf cases when desired.

HENRY LUBY.

REFERENCES CITED

The following references are of record in the file of this patent:

UNITED STATES PATENTS

| Number | Name | Date |
|---|---|---|
| 1,317,044 | Shannon | Sept. 23, 1919 |
| 1,432,439 | Bixler | Oct. 17, 1922 |
| 2,173,112 | Hawkins | Sept. 19, 1939 |